United States Patent
Iwasaki

(10) Patent No.: US 7,518,946 B2
(45) Date of Patent: Apr. 14, 2009

(54) MEMORY CONTROL DEVICE

(75) Inventor: Keiichi Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 21 days.

(21) Appl. No.: 11/854,372

(22) Filed: Sep. 12, 2007

(65) Prior Publication Data

US 2008/0225629 A1    Sep. 18, 2008

(30) Foreign Application Priority Data

Sep. 15, 2006    (JP) .............................. 2006-250951

(51) Int. Cl.
*G11C 8/00* (2006.01)
(52) U.S. Cl. ................. 365/233.1; 365/194; 365/233.13
(58) Field of Classification Search .............. 365/233.1, 365/194, 233.13
See application file for complete search history.

(56) References Cited

U.S. PATENT DOCUMENTS 6,677,791 B2 *   1/2004   Okuda et al. ................. 327/158
7,161,854 B2 *   1/2007   Iwasaki ....................... 365/193

FOREIGN PATENT DOCUMENTS

| JP | 2000-173267 | 6/2000 |
|----|-------------|--------|
| JP | 2002-7200 | 1/2002 |
| JP | 2003-85999 | 3/2003 |
| JP | 2003-91453 | 3/2003 |
| JP | 2004-126772 | 4/2004 |
| JP | 2005-56334 | 3/2005 |
| JP | 2005-78547 | 3/2005 |
| JP | 3754201 | 12/2005 |
| JP | 2006-65470 | 3/2006 |

* cited by examiner

*Primary Examiner*—Huan Hoang
(74) *Attorney, Agent, or Firm*—Dickstein Shapiro LLP

(57) ABSTRACT

A memory control device is disclosed that comprises a clock generator that generates a reference clock, a DLL circuit that receives the reference clock from the clock generator and outputs an output value indicative of a clock cycle of the reference clock, a delay setting circuit that receives the output value from the DLL circuit and outputs a delay setting value based on the output value according to at least one parameter, and plural delay elements that receive the delay setting value and introduce a delay responsive to the delay setting value. One or more of the delay elements receive input signals from corresponding one or more flip-flops driven by drive clocks generated by the clock generator, and send output signals to corresponding one or more output buffers that are to be connected to a memory.

15 Claims, 8 Drawing Sheets

MEMORY CONTROL DEVICE

BACKGROUND OF THE INVENTION

1. Field of the Invention

The present invention relates to a memory control unit for a DDR-SDRAM.

2. Description of the Related Art

DDR memories such as DDR1-SDRAMs and DDR2-SDRAMs are becoming a mainstream of DRAM (Dynamic Random Access Memory) used as high capacity memories. Especially, it is standardized that the DDR2-SDRAMs have clock rate of 400 MHz-800 MHz according to the specification of the JEDEC (Joint Electron Device Engineering Council).

As the operating speed of the DDR-SDRAMs is increased, the influence of wiring delay and skew between a memory control LSI and a memory LSI on a substrate is increasing. It is therefore becoming difficult to develop an ASIC (Application Specific Integrated Circuit) and connect it to a high-speed DDR-SDRAM.

For example, in the case of a DDR266, which is an interface for DDR-SDRAM and has a clock frequency of 133 MHz, it is possible to develop a memory control ASIC based on estimated wiring delay and skew on a substrate with a small number of memories mounted thereon and on a substrate with a large number of memories mounted thereon. On the other hand, DDR2-533 has a clock frequency as great as 266 MHz, and DDR2-800 has a clock frequency as great as 400 MHz. Accordingly, the influence of the wiring delay and skew is relatively greater. If the wiring delay and skew are wrongly estimated and ASICs are developed based on the wrong estimate, there is a high likelihood that the ASICs cannot be used. Moreover, because the wiring delay and skew amount differ depending on the type, the number, and the layout of memories to be connected, it will possibly be necessary to develop an ASIC for each substrate.

FIG. 8A is a timing chart of SDRAM waveforms in the vicinity of a terminal of a memory control ASIC. FIG. 8B is a timing chart of SDRAM waveforms in the vicinity of a terminal of a memory. FIGS. 8A and 8B each show waveforms of CK (memory clock), Address/Ras/Cas/We (address and command), Cs (chip select), DQS [3:0] (data strobe), DQ [31:0] (data bus), and DM [3:0]. As is clear from a comparison between FIG. 8A and FIG. 8B, since the amounts of wiring delay and skew are constant regardless of the clock cycle, the shorter the clock cycle, the greater the influence of the wiring delay and skew.

FIG. 7 shows an example of a standard for the write side of DDR2-SDRAM. As is obvious from the figure, the shorter the clock cycle, the more attention needs to be paid to the skew on the substrate when developing an ASIC.

Japanese Patent Laid-Open Publication No. 2005-56334 discloses, as a DDR interface that loads data signals on the rising and falling edges of a data strobe signal, a data loading circuit capable of eliminating the difference in delay between the data signals. Japanese Patent Laid-Open Publication No. 2004-126772 discloses a memory controller for inputting digital data to and outputting digital data from a semiconductor storage device such as a DDR-SDRAM. This memory controller is capable of accurately synchronizing a strobe signal generated from a clock signal with the digital data. Japanese Patent Laid-Open Publication No. 2005-78547 discloses a semiconductor integrated circuit that precisely and stably synchronizes signals loaded from an external DDR-SDRAM.

SUMMARY OF THE INVENTION

The present invention is directed to provide a memory control device that allows development of a memory control ASIC without being affected by the amounts of delay and skew on a substrate. The present invention is also directed to provide a memory control device having a function for correcting the amounts of delay and skew on a substrate.

According to an aspect of the present invention, there is provided a memory control device that comprises a clock generator that generates a reference clock, a DLL circuit that receives the reference clock from the clock generator and outputs an output value indicative of a clock cycle of the reference clock, a delay setting circuit that receives the output value from the DLL circuit and outputs a delay setting value based on the output value according to at least one parameter, and plural delay elements that receive the delay setting value and introduce a delay responsive to the delay setting value. One or more of the delay elements receive input signals from corresponding one or more flip-flops driven by drive clocks generated by the clock generator, and send output signals to corresponding one or more output buffers that are to be connected to a memory.

According to another aspect of the present invention, there is provided a memory control device that comprises a clock generator that generates a reference clock, a DLL circuit that receives the reference clock from the clock generator and outputs an output value indicative of a clock cycle of the reference clock, a delay setting circuit that receives the output value of the DLL circuit and outputs plural delay setting values based on the output value according to respective plural parameters, and plural delay elements that receive the respective delay setting values and introduce delays responsive to the respective delay setting values. One or more of the delay elements receive input signals from corresponding one or more flip-flops driven by drive clocks generated by the clock generator, and send output signals to corresponding one or more output buffers that are to be connected to a memory.

With use of embodiments of the present invention, it is possible to develop an ASIC including a memory control device as shown in FIG. 3 even if delay and skew occur on a substrate. Further, in one embodiment of the present invention, if the type and the number of memories on a substrate are changed, a delay parameter is changed for each substrate via an external CPU. It is thus possible to provide an applicable ASIC.

DETAILED DESCRIPTION OF THE PREFERRED EMBODIMENT

Preferred embodiments of the present invention are described below with reference to the accompanying drawings.

First Embodiment

Figure 1:
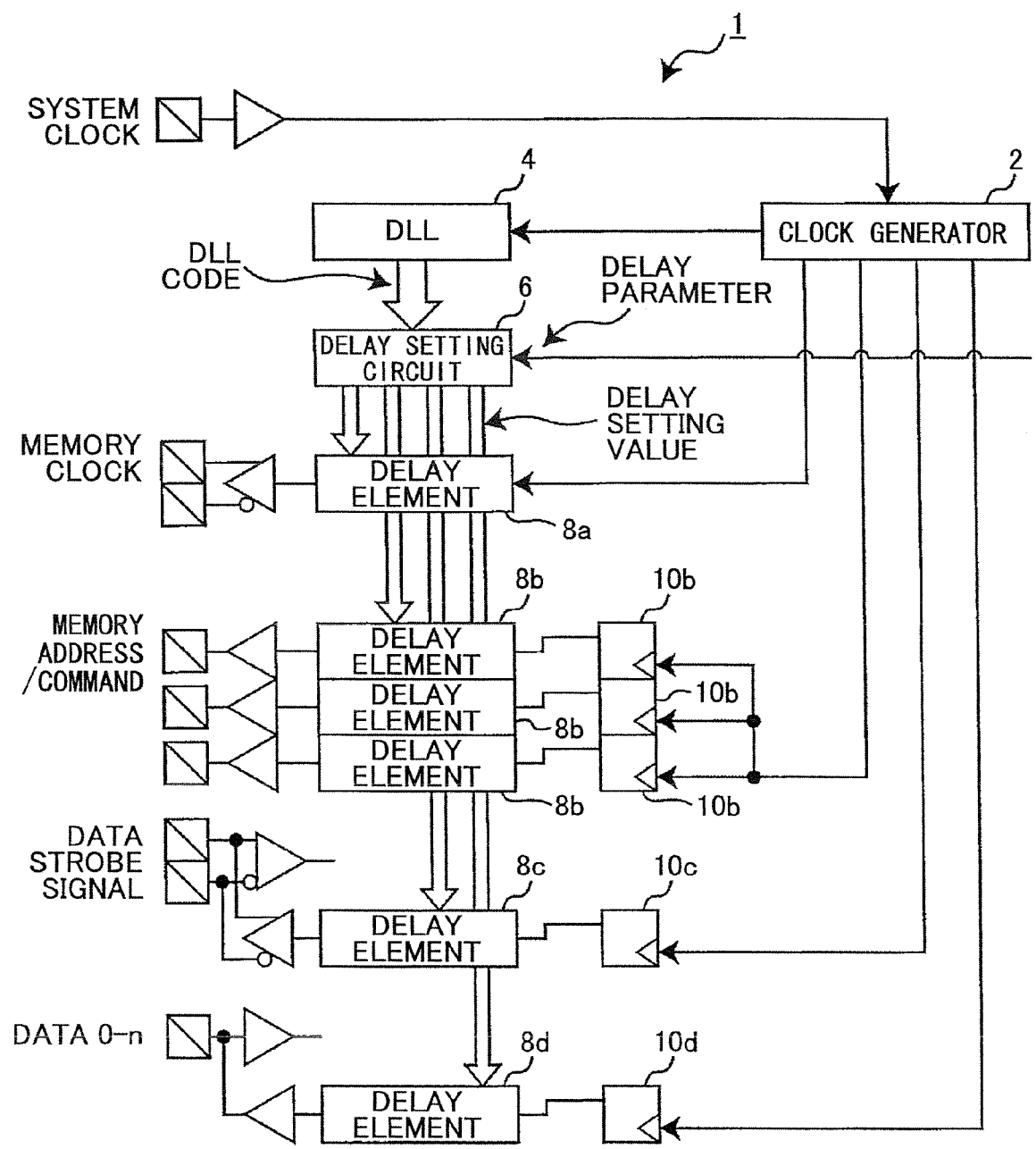
FIG. 1 is a block diagram illustrating a memory control device according to a first embodiment of the present invention.

FIG. 1 is a block diagram illustrating a memory control device 1 according to a first embodiment of the present invention. A clock generator 2 is configured to take in a system clock and generate a reference clock for a DLL (Delay Locked Loop) circuit 4, an output clock for a memory clock, and drive clocks for flip-flops 10b, 10c and 10d that drive output signals, such as memory addresses, commands, and data, to the memory. The flip-flops 10b, 10c, and 10d are connected to delay elements 8b, 8c, and 8d, respectively. The delay elements 8b, 8c, and 8d are connected to inputs of respective output buffers (in the memory) for memory addresses, commands, and data.

Figure 2:
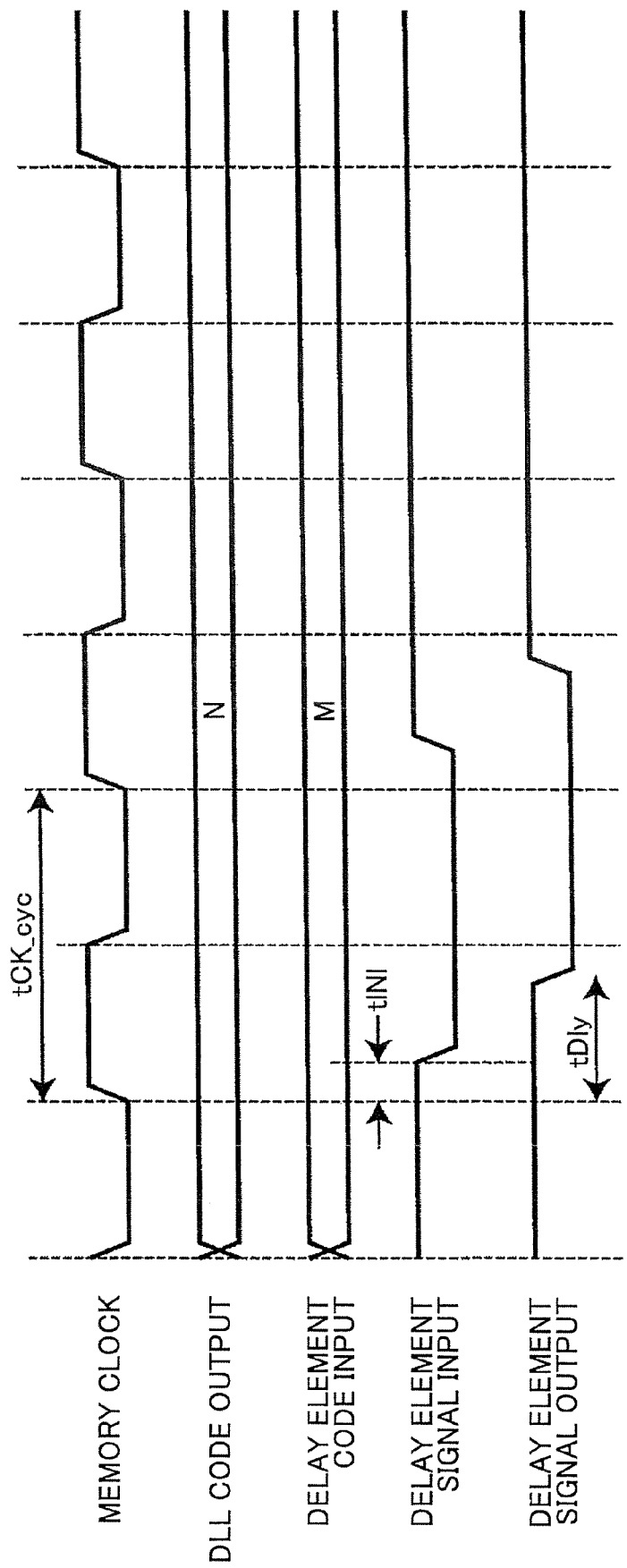
FIG. 2 is a waveform chart illustrating operations of a delay setting circuit, mainly input to and output from the delay setting circuit.

FIG. 2 is a waveform chart illustrating operations of a delay setting circuit 6, mainly input to and output from the delay setting circuit 6. The delay setting circuit 6 is configured to input an output (DLL code) from the DLL circuit 4, and outputs a delay setting value to the delay elements 8a, 8b, 8c, and 8d using a delay parameter. Each of the delay elements 8a, 8b, 8c, and 8d is configured to receive the delay setting value as a delay setting and determine a delay value based on the delay setting value.

The DLL circuit 4 includes a delay element capable of setting the delay value by combining (or adding together) delay units provided therein. The delay unit as used herein indicates a partial circuit for generating a minimum delay time (i.e. unit of delay time) used in a memory control device 1 of this embodiment of the present invention, and the unit of delay time. The DLL code output generated by the DLL circuit 4 corresponds to the number of delay units (units of delay time), which is equal to a (reference) clock cycle calculated by the DLL circuit 4 based on the cycle of the system clock.

The delay element (8a, 8b, 8c, and 8d) includes the same number of delay units as the number of the delay elements of the DLL circuit 4. The number of delay units (circuits) of the delay element (8a, 8b, 8c, and 8d) may or may not be the same as the number of the delay units of the delay element included in the DLL circuit 4.

If the delay parameter is "⅛", the relationship between the DLL code output N and a delay element code input M of FIG. 2 is expressed as follows:

$$M = N \times 1/8 \qquad \text{<Expression 1>.}$$

Based on Expression 1, a delay value "tDly" of the delay element is expressed as follows:

$$tDly = tINI + tCK\_cyc \times 1/8 \qquad \text{<Expression 2>,}$$

wherein "tCK_cyc" represents a cycle of a memory clock, and "tINI" represents a unique value of delay introduced by the delay element (8a, 8b, 8c, and 8d) even if the delay parameter is 0 because a circuit for selecting the delay units (circuits) is provided in the delay element.

In the case where the output buffer connected to the delay element output shown in the waveform chart (timing chart) of FIG. 2 is for a chip select for the memory, if the unique setting value of the delay element 8a with respect to the memory clock is 0, a delay difference of "tCK_cyc×⅛" is given to the chip select at an output terminal of the memory control device 1. In this way, it is possible to introduce a more stable delay by setting the delay parameter based on the delay on the substrate.

Second Embodiment

In the memory control device 1 in the first embodiment, one delay parameter is used for the delay setting circuit 6. On the other hand, in a memory control device 1 of a second embodiment, plural delay parameters are set one for each group of output signals to be output to the memory. Preferably, one delay parameter is set for a strobe signal, and at least another delay parameter is set for plural data items corresponding to the strobe signal.

Figure 4:
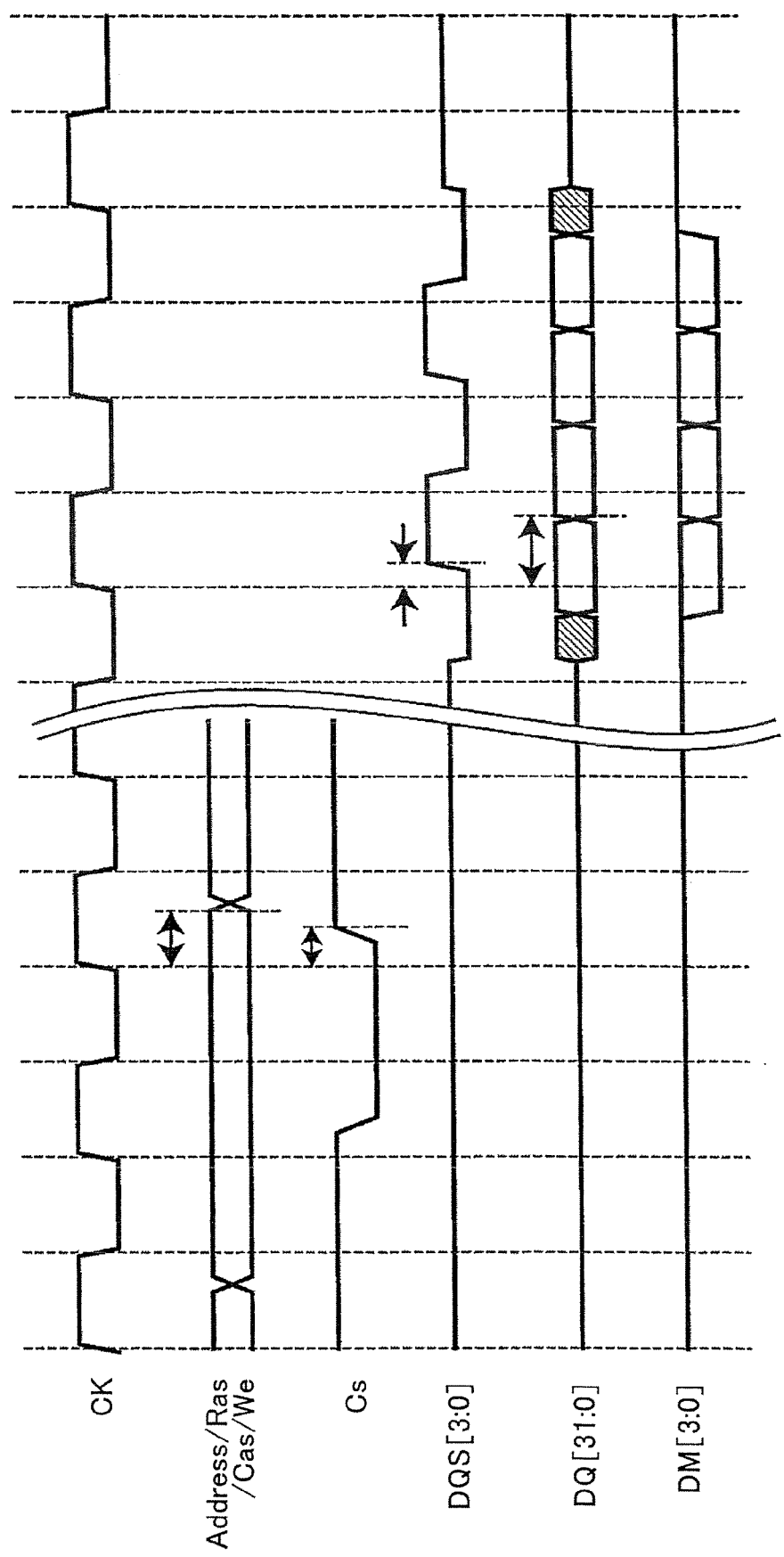
FIG. 4 is a waveform chart in the case where delay values are set one for each group of memory output signals.
Figure 5:
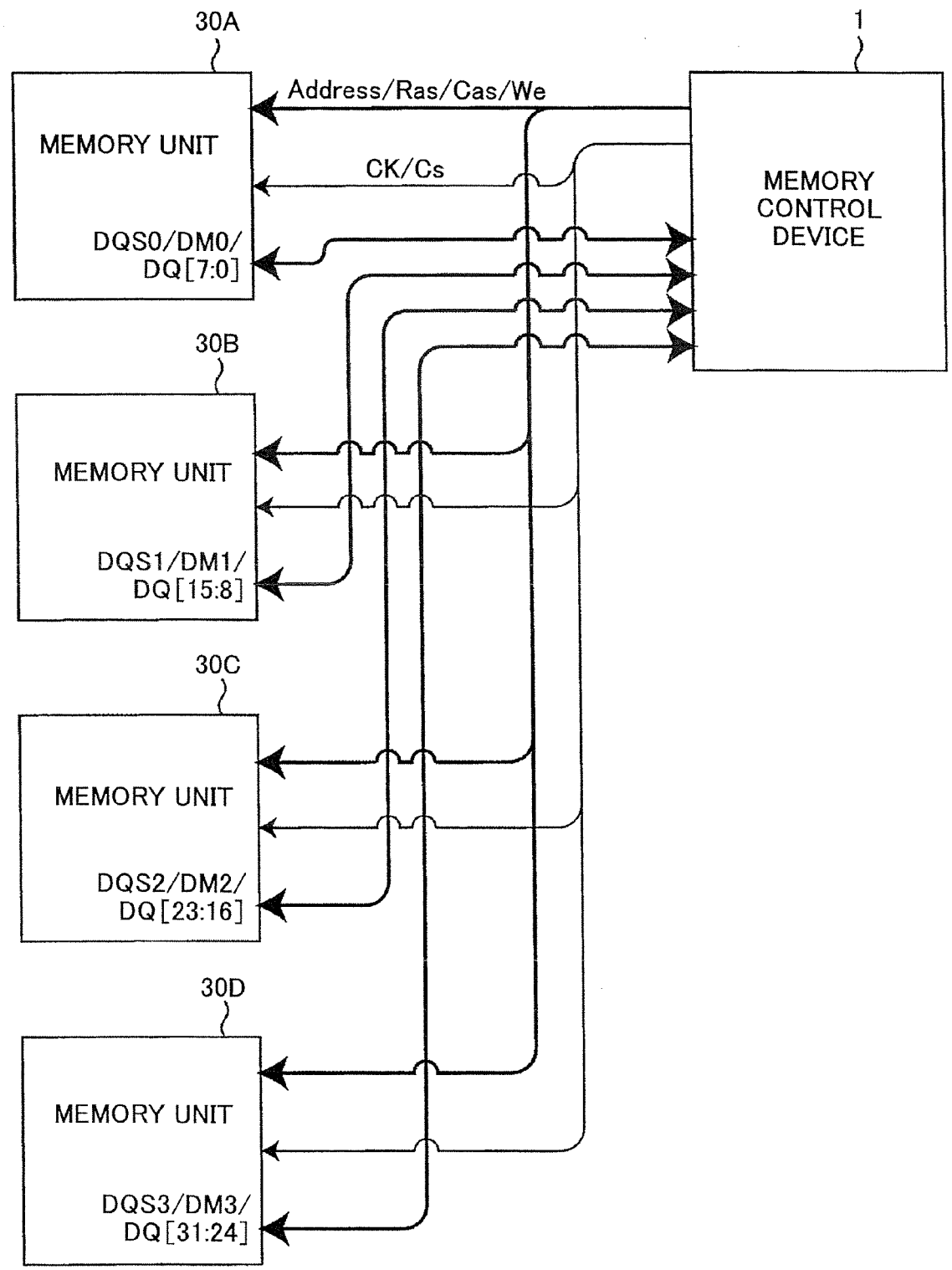
FIG. 5 is a diagram showing a layout of a memory control device and memory units.

For example, if the memory has an 8-bit data width, the memory control device 1 and memory units 30A, 30B, 30C, and 30D are arranged as shown in FIG. 5. Because the distances from the memory control device 1 to each of the memory units 30A, 30B, 30C, and 30D are different from one another, different display parameters (and delay setting values) are provided for the respective distance relationships, thereby satisfying the DDR-SDRAM standard shown in FIG. 7 and the DDR1-SDRAM standard. FIG. 4 is a waveform chart in the case where plural delay values are set one for each group of memory output signals. The delay parameters are set by an external unit such as a CPU.

The delay setting of the memory control devices 1 described in the first and second embodiments is applicable to clock output. Thus, in the case of supplying a clock output from the memory control device 1 to the memory units arranged as shown in FIG. 5 via a clock buffer, effects of the embodiments of the present invention can be obtained even if the delay of the clock is great.

Third Embodiment

The waveform (timing) chart shown in FIG. 4 shows that the delay value does not have to be great enough to correspond to one memory clock cycle. If it is sufficient that the delay required as the delay (setting) value is a half of the memory clock cycle, the cycle of the clock to be input to the DLL circuit 4 may be a half of the cycle of the memory clock generated by the clock generator 2 (i.e. the frequency of the clock to be input to the DLL circuit 4 may be twice the frequency of the memory clock). If it is sufficient that the delay required as the delay (setting) value is 1/N (N is a natural number) of the memory clock cycle, the cycle of the clock to be input to the DLL circuit 4 may be 1/N of the cycle of the memory clock generated by the clock generator 2 (i.e. the frequency of the clock to be input to the DLL circuit 4 may be 1/N of the frequency of the memory clock).

Figure 3:
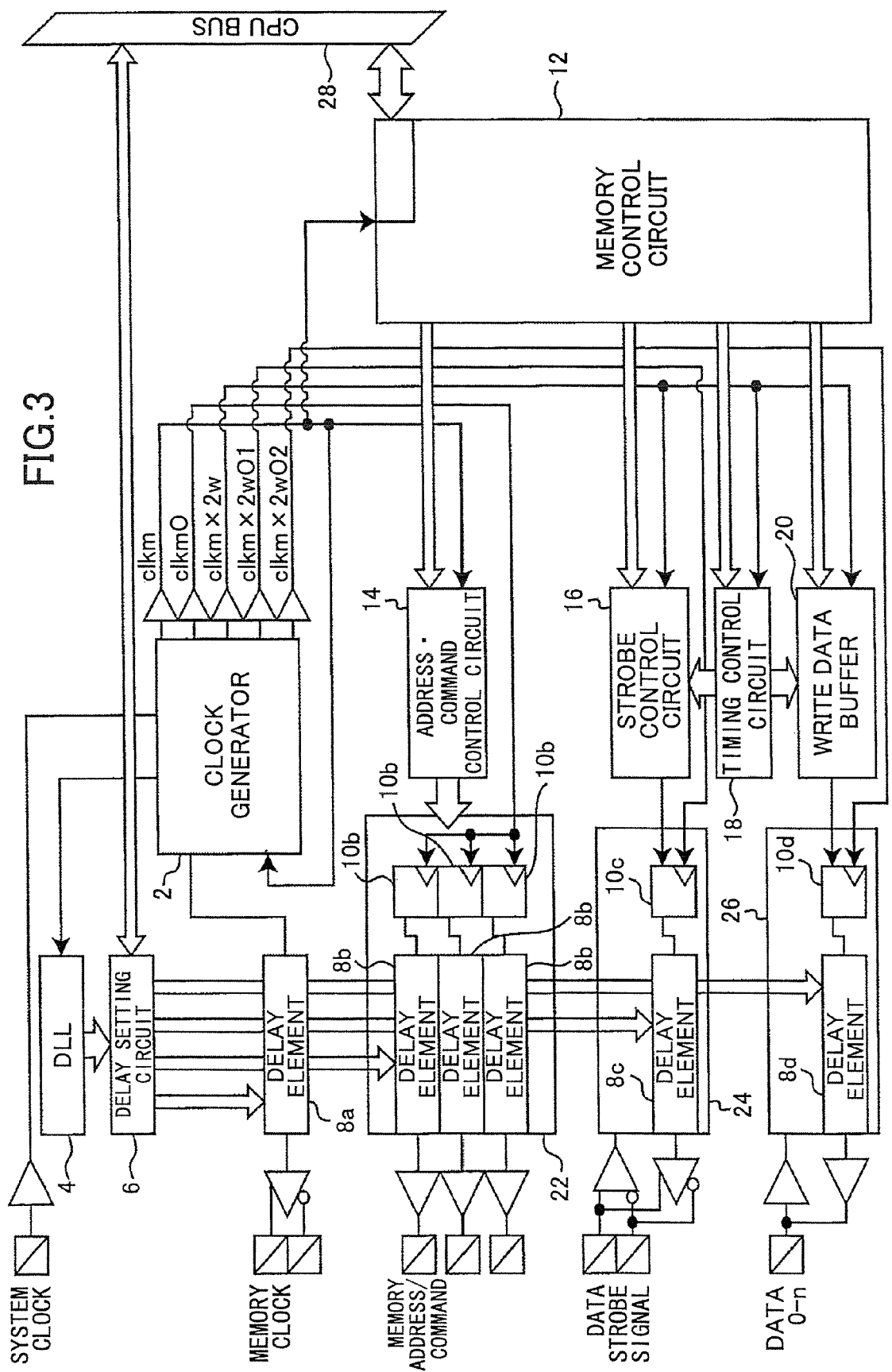
FIG. 3 is a block diagram illustrating a semiconductor device including a memory control device according to an embodiment of the present invention.

In DDR-SDRAMs, strobe signals, data and data mask signals have twice the frequency of the memory clock. For operating the flip-flops 10c and 10d connected to the delay elements 8c and 8d for these signals at twice the frequency, the flip-flops 10c and 10d are connected to the delay elements 8c and 8d, respectively. This configuration eliminates the need to provide a circuit that causes delay due to such as multiplexing, resulting in accurate control of the delay (setting) value. In FIG. 3, the output of the clock generator "clkm×2* (clkm×2w, clkm×2wO1, and clkm×2wO2)" represents the output being twice the memory clock.

Alternative Embodiment

Figure 6:
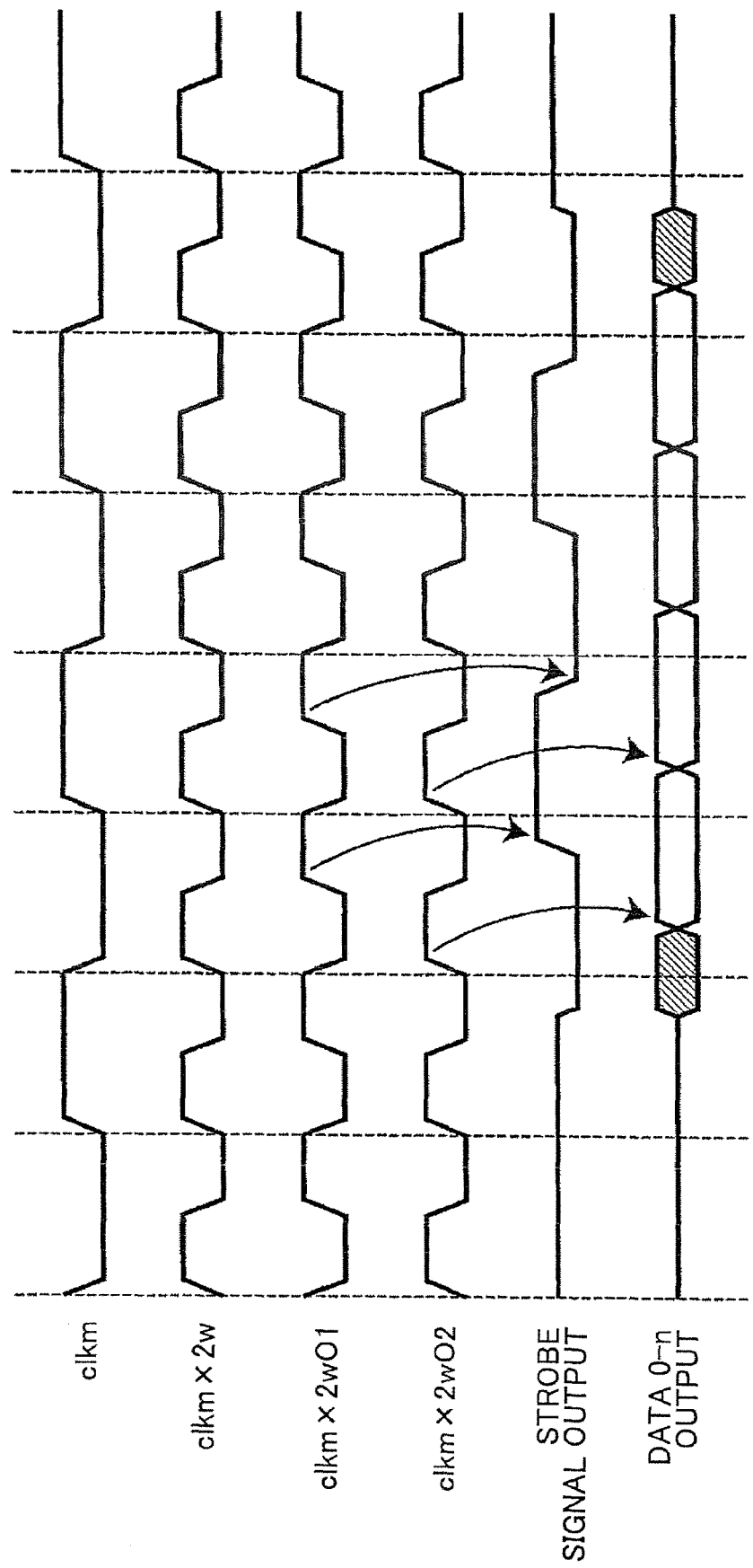
FIG. 6 is a waveform chart of outputs of a clock generator, a strobe signal, and a data output signal.
Figure 7:
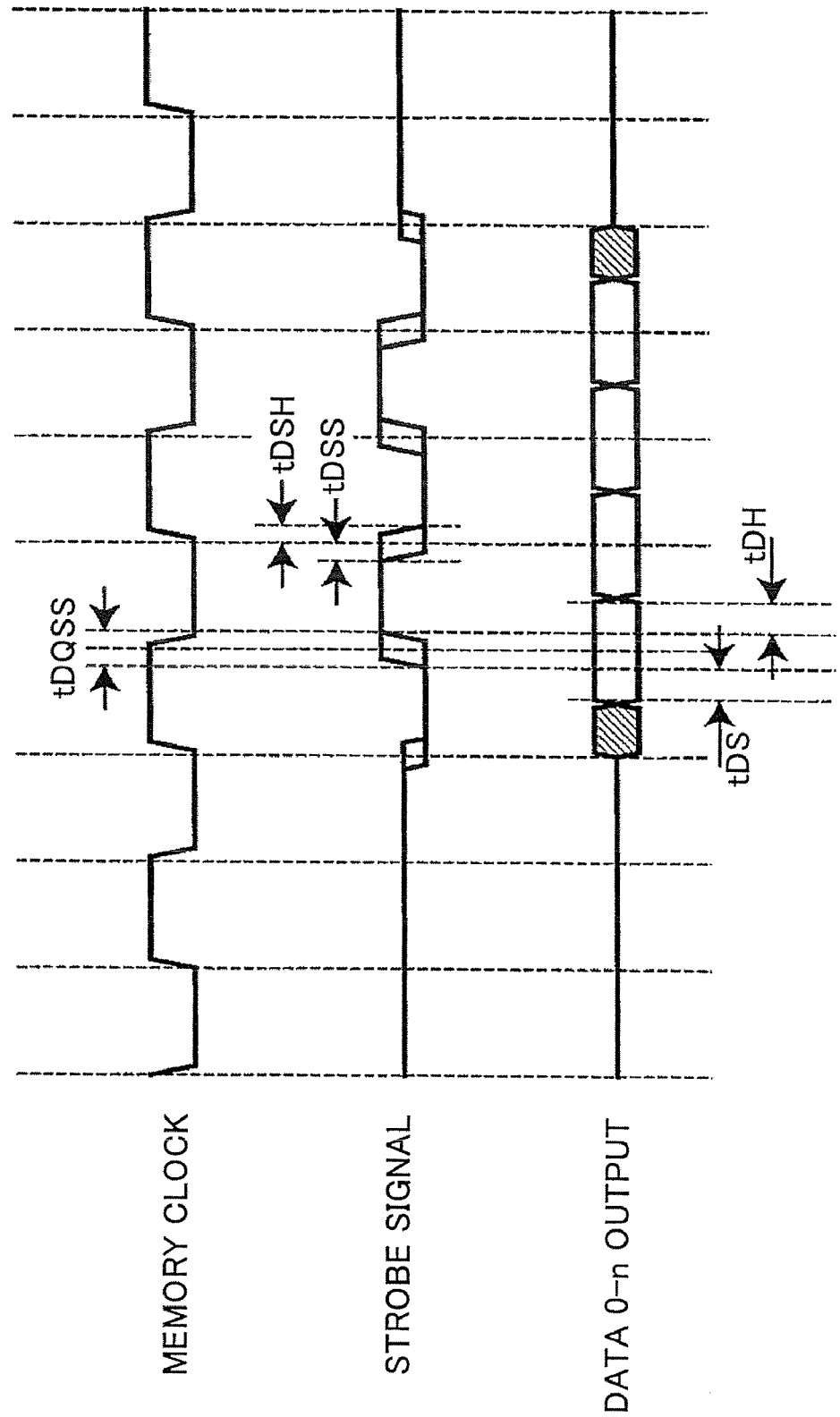
FIG. 7 is a waveform chart showing an example of a standard for a write side in a DDR2-SDRAM related to a memory clock, a strobe signal, and a data output signal.
Figure 8A:
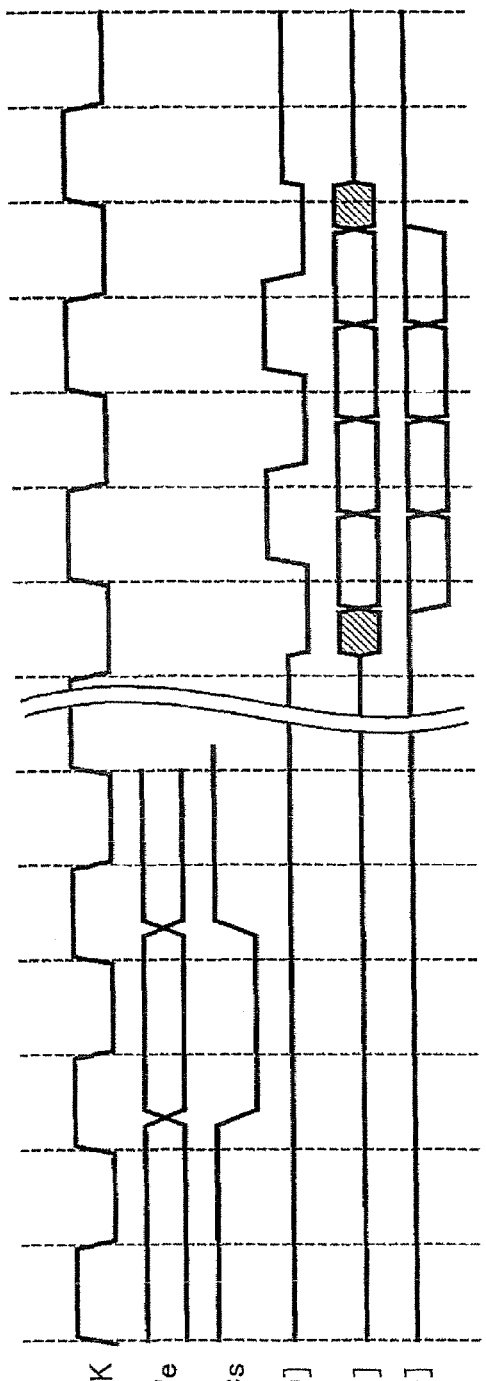
FIG. 8A is a timing chart showing a SDRAM waveform near a terminal of a related-art memory control ASIC.
Figure 8B:
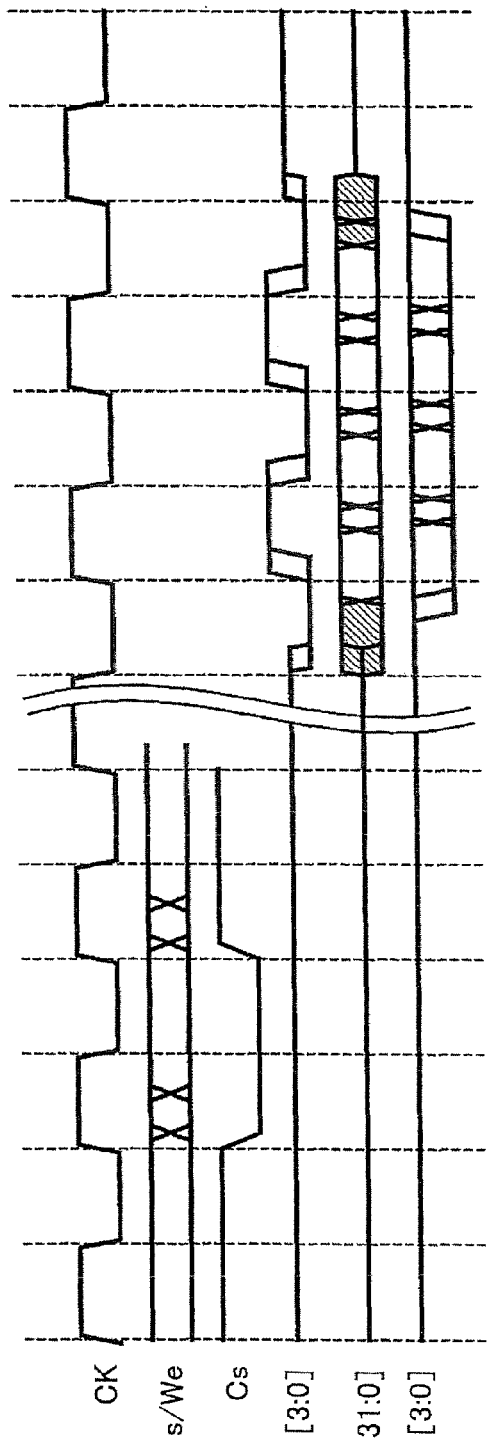
FIG. 8B is a timing chart showing a SDRAM waveform near a terminal of a memory.

Strobe signals, data and data mask signals used in DDR1/DDR2-SDRAMs need to satisfy the timing standard as shown in FIG. 7. Therefore, as shown in FIG. 6 and FIG. 3, a clock (clkm×2wO1) for driving the strobe signal and a clock (clkm×2wO2) for driving the data and the data mask signal have a 180 degree phase difference so as to satisfy the timing (standard). This facilitates correction of delay on the substrate (i.e. the delay setting in the first through third embodiments).

As shown in FIG. 5, the address and the command (Ras/Cas/We signals of SDRAM) are signals that are sent to all of the memory units 30A-30D. As shown in the waveform (timing) chart of FIG. 4, by determining the Ras/Cas/We signals one cycle before activation of a chip select (Cs) at the latest, influence due to delay on the substrate can be reduced.

The present application is based on Japanese Priority Application No. 2006-250951 filed on Sep. 15, 2006, with the Japanese Patent Office, the entire contents of which are hereby incorporated by reference.

What is claimed is:

1. A memory control device, comprising:
a clock generator that generates a reference clock;
a DLL circuit that receives the reference clock from the clock generator and outputs an output value indicative of a clock cycle of the reference clock;
a delay setting circuit that receives the output value from the DLL circuit and outputs a delay setting value based on the output value according to at least one parameter; and
plural delay elements that receive the delay setting value and introduce a delay responsive to the delay setting value;
wherein one or more of the delay elements receive input signals from corresponding one or more flip-flops driven by drive clocks generated by the clock generator, and send output signals to corresponding one or more output buffers that are to be connected to a memory.

2. The memory control device as claimed in claim 1, wherein one of the delay elements is connected to an output buffer for supplying a clock to the memory, and said one of the delay elements receives an input from the clock generator.

3. The memory control device as claimed in claim 1, wherein the reference clock has N (N is a natural number) times the frequency of a memory clock.

4. The memory control device as claimed in claim 1, wherein a first flip-flop corresponding to the delay element for a data strobe signal and a second flip-flop corresponding to the delay element for data and a data mask signal operate at twice the frequency of a memory clock.

5. The memory control device as claimed in claim 4, wherein a first drive clock for driving the first flip-flop for a data strobe signal has a 180 degree phase difference from a second drive clock for driving the second flip-flop for data and a data mask signal.

6. The memory control device as claimed in claim 1, wherein values of an address and a command to be output to the memory are determined at least one cycle before a chip select signal is activated.

7. The memory control device as claimed in claim 1;
wherein the delay element includes plural first delay units as partial circuits each generating a first unit of delay time;
wherein the DLL circuit includes a second delay unit that sets a delay by adding together second delay units as partial circuits each generating a second unit of delay time; and
wherein the first unit of delay time is equal to the second unit of delay time.

8. A memory control device, comprising:
a clock generator that generates a reference clock;
a DLL circuit that receives the reference clock from the clock generator and outputs an output value indicative of a clock cycle of the reference clock;
a delay setting circuit that receives the output value of the DLL circuit and outputs plural delay setting values based on the output value according to respective plural parameters; and
plural delay elements that receive the respective delay setting values and introduce delays responsive to the respective delay setting values;
wherein one or more of the delay elements receive input signals from corresponding one or more flip-flops driven by drive clocks generated by the clock generator, and send output signals to corresponding one or more output buffers that are to be connected to a memory.

9. The memory control device as claimed in claim 8, wherein one of the delay elements is connected to an output buffer for supplying a clock to the memory, and said one of the delay elements receives an input from the clock generator.

10. The memory control device as claimed in claim 8, wherein the reference clock has N (N is a natural number) times the frequency of a memory clock.

11. The memory control device as claimed in claim 8;
wherein the plural delay elements include a delay element for an address and a command, a delay element for a chip select signal, and a delay element for data and a data mask signal, the delay elements introducing different delays responsive to different delay setting values.

12. The memory control device as claimed in claim 8, wherein a first flip-flop corresponding to the delay element for a data strobe signal and a second flip-flop corresponding to the delay element for data and a data mask signal operate at twice the frequency of a memory clock.

13. The memory control device as claimed in claim 12, wherein a first drive clock for driving the first flip-flop for a data strobe signal has a 180 degree phase difference from a second drive clock for driving the second flip-flop for data and a data mask signal.

14. The memory control device as claimed in claim 8, wherein values of an address and a command to be output to the memory are determined at least one cycle before a chip select signal is activated.

15. The memory control device as claimed in claim 8;
wherein the delay element includes plural first delay units as partial circuits each generating a first unit of delay time;
wherein the DLL circuit includes a second delay unit that sets a delay by adding together second delay units as partial circuits each generating a second unit of delay time; and
wherein the first unit of delay time is equal to the second unit of delay time.

* * * * *